United States Patent [19]
Lin

[11] Patent Number: 6,148,662
[45] Date of Patent: Nov. 21, 2000

[54] HIGH-SENSITIVITY STRAIN PROBE

[75] Inventor: Yung-Shi Lin, Taipei, Taiwan

[73] Assignee: Industrial Technology Research Institute, Hsinchu, Taiwan

[21] Appl. No.: 09/313,214

[22] Filed: May 18, 1999

Related U.S. Application Data

[60] Division of application No. 08/865,967, May 30, 1997, Pat. No. 5,907,095, which is a continuation-in-part of application No. 08/664,641, Jun. 17, 1996.

[51] Int. Cl.[7] .................................................. G01B 5/28
[52] U.S. Cl. ............................................ 73/105; 29/621.1
[58] Field of Search ........................... 73/105, 763, 768, 73/769, 774, 777, 781; 29/621.1

[56] References Cited

U.S. PATENT DOCUMENTS

| | | | |
|---|---|---|---|
| 4,674,186 | 6/1987 | Galiano | 30/169 |
| 5,266,801 | 11/1993 | Elings . | |
| 5,325,081 | 6/1994 | Roberts | 338/2 |
| 5,345,815 | 9/1994 | Albrecht et al. . | |
| 5,386,720 | 2/1995 | Toda et al. . | |
| 5,400,647 | 3/1995 | Elings . | |
| 5,468,959 | 11/1995 | Tohda et al. . | |
| 5,469,733 | 11/1995 | Yasue et al. | 73/105 |
| 5,907,095 | 5/1999 | Lin . | |
| 6,072,247 | 6/2000 | Lammert et al. | 307/10.1 |

*Primary Examiner*—Max Noori
*Attorney, Agent, or Firm*—Smith Grambrell & Russell, LLP

[57] ABSTRACT

The present invention is a high-sensitivity strain probe used in high-sensitivity sensor elements of force type. By the use of semiconductor process and wire bonding technology as well as integrated forming method, the fabricated elements include: a probe, a cantilever, a cantilever substrate, resistance materials, and a processing circuit that can be applied to a probe microscope to greatly reduce the number of elements of the scanning probe microscopy. The invention attains the object of lowering the cost and effectively solves the problems of an excessively large signal-to-noise ratio and avoids using the optical elements present in a conventional microscopic probe avoiding various inconveniences and shortcomings of the prior art.

6 Claims, 10 Drawing Sheets

HIGH-SENSITIVITY STRAIN PROBE

This present application is a divisional of U.S. patent application Ser. No. 08/865,967, filed May 30, 1997, now U.S. Pat. No. 5,907,095. U.S. patent application Ser. No. 08/865,967 represents a continuation-in-part of U.S. patent application No. 08/664,641 filed on Jun. 17, 1996 which, in its entirety, is incorporated herein by reference.

FIELD OF INVENTION

The present invention relates to a high-sensitivity strain probe able to be used with high-sensitivity sensor elements of force type. The microscopic probe integrated by the use of strain gauge and measuring circuit, can greatly cut down the number of elements of the scanning probe microscope, reduce the space of operation, thereby reducing the cost.

BACKGROUND OF THE INVENTION

Various kinds of scanning probe microscopes such as AFM (Atomic Force Microscope), MFM (Magnetic Force Microscope), and SNOM (Scanning Near-Field Optical Microscope) are all of the type of microscope which uses a special microscopic probe to detect certain types of interaction between the probe and the surface of a sample, for instance, tunneling current, atomic force, magnetic force, and scanning near-field electro-magnetic wave. Then, using a piezo-electric ceramic scanner having displacements in three axes, allows the probe to scan the surface of the sample in front-and-back as well as left-and-right directions. It also utilizes the capability of minute adjustment in the vertical axis and feedback circuit to maintain its location. The interaction between the probe and the sample during the scanning process makes the distance, which is anywhere between several Å (angstroms) to several hundred Å, relatively constant. One can obtain the interactive action chart of the sample's surface so long as one records the minute-adjusted distance in the vertical axis for each point on the scanned surface. This data can be used to derive the surface characteristic of the sample.

The strain probe microscope of the prior art is used to measure the minute action of the microscopic probe by using the reflex refracted angle of a laser. By using a laser to focus on the probe, the beam reflects back to the laser sensor to measure the deformation on the probe by taking the signal measured from the laser sensor. In order to obtain the optimum amplified signal, one uses the increase of the reflection distance to project and amplify the strain signal of the probe, hence the range of required space is relatively large. Also, this type of probe system needs a lot of elements including: the probe, a laser diode, a reflex mirror focusing object lens, a splitted laser inductor, and a signal processing circuit; which have the shortcomings of being complicated in structure, expensive in terms of optical elements and not easily used.

Although the disclosure of U.S. Pat. No. 5,386,720 to Toda appears to be similar to that of the present invention, however, the objective is completely different. The major difference is that the wire terminals 220, 18, 129, 222, 312, 314, 316 as shown in the Figures and discussed in the specification in the Toda patent are located at the bottom of the cantilever while those of the present invention are on the top of the cantilever. The major disadvantage of placing wire terminals at the bottom is that it is hard to connect wires to them, for example element 44 in FIG. 2, since the height of the probe tip is very small (several μm). The diameter and the connection of the wire 44 will affect the scanning action of the probe tip and the test piece. The present invention in contrast changes the location of the wire terminal to the top of the cantilever. Besides, the Toda patent discloses fabrication only of the main body of the cantilever and the respective processing circuit is an exterior type as shown in FIG. 2, FIG. 12, FIG. 16, and FIG. 17, but the volume and space it occupies are all relatively large which will result in the situation that the volume of the overall probe microscope can not be reduced. Besides this disadvantage, since the exterior processing circuits (236, 238, 240) need wire connections, these wire connections will cause the signal interference and noise which will further reduce the signal accuracy. Also, the length of the piezoresistive material becomes longer than what it normally is because of the relatively long wire which will result in high noise and a relatively low signal-to-noise ratio. In order to resolve the space and noise problems, the present invention fabricates the circuit at the terminal of the cantilever which can handle the signal nearby and also reduce the volume, thereby, increasing the signal-to-noise ratio and further raising the overall measuring accuracy and ability of the probe.

U.S. Pat. No. 5,266,801 makes use of the piezoelectric or piezoresistive materials to measure the strain on the cantilever, but it still has the noise problem left irresolvable for the signal along the connecting wire. Also, the exterior transfer and processing circuit occupies a relatively large space and complicates the system structure.

U.S. Pat. No. 5,400,647 measures, by using an Atomic Force Microscope, the transverse force which is related to the magnitude of the frictional force. The Atomic Force Microscope makes use of the optical way to measure the deformation of the cantilever. Similar to other prior art Atomic Force Microscopes, since they have many optical elements, their system spaces are relatively large, their structures are relatively complicated, and the noise problems of their connecting wires still exist.

U.S. Pat. No. 5,468,959 is a method for measuring the surface not the particular elements of the probe apparatus itself. Although the patent does mention the probe in FIG. 5, however, this probe is not the focus of the patent. This patent mainly describes the use of capacitor and electro-static force, and the measurement of displacements and external electro-static force. This kind of probe is relatively hard to fabricate and its characteristic is still under evaluation.

SUMMARY OF THE INVENTION

In order to overcome the above-mentioned shortcomings, the inventor has studied and developed an integrated type of high sensitivity strain probe which makes use of semiconductor processing and wire bonding technology to assemble the following elements: a probe, a cantilever, a cantilever substrate, a resistance material, and a processing circuit by employing the integrated forming mode. This invention can be used with the existing probe microscope which can greatly reduce the number of elements to attain the object of reducing the cost and effectively resolving the shortcomings of the necessity of using optical elements in the conventional microscopic probe and the large signal-to-noise ratio.

The main object of the present invention is to provide a high-sensitivity strain probe which makes use of resistance material having variable electrical resistance value to directly measure the deformation of the microscopic probe and further transmit signals to the processing circuit at the rear end of the probe to be processed and amplified.

Another object of the present invention is to provide a high-sensitivity strain probe which can cut down the number of elements, reduce the cost, save time and have high reliability. The invention makes use of the processing circuit to process the signal of variable electrical resistance, thereby, it can greatly reduce the effect of noise and interference.

For these reasons and in order to further explain the stricture and principle of the present invention, the inventor herewith presents a detailed and clear illustration together with the accompanying drawings.

BRIEF DESCRIPTION OF THE DRAWINGS AND INDEX FOR THEIR COMPONENT NUMBERS (A) The Drawings FIG. 1 is the schematic diagram of the outward appearance of the present invention.

Figure 1:
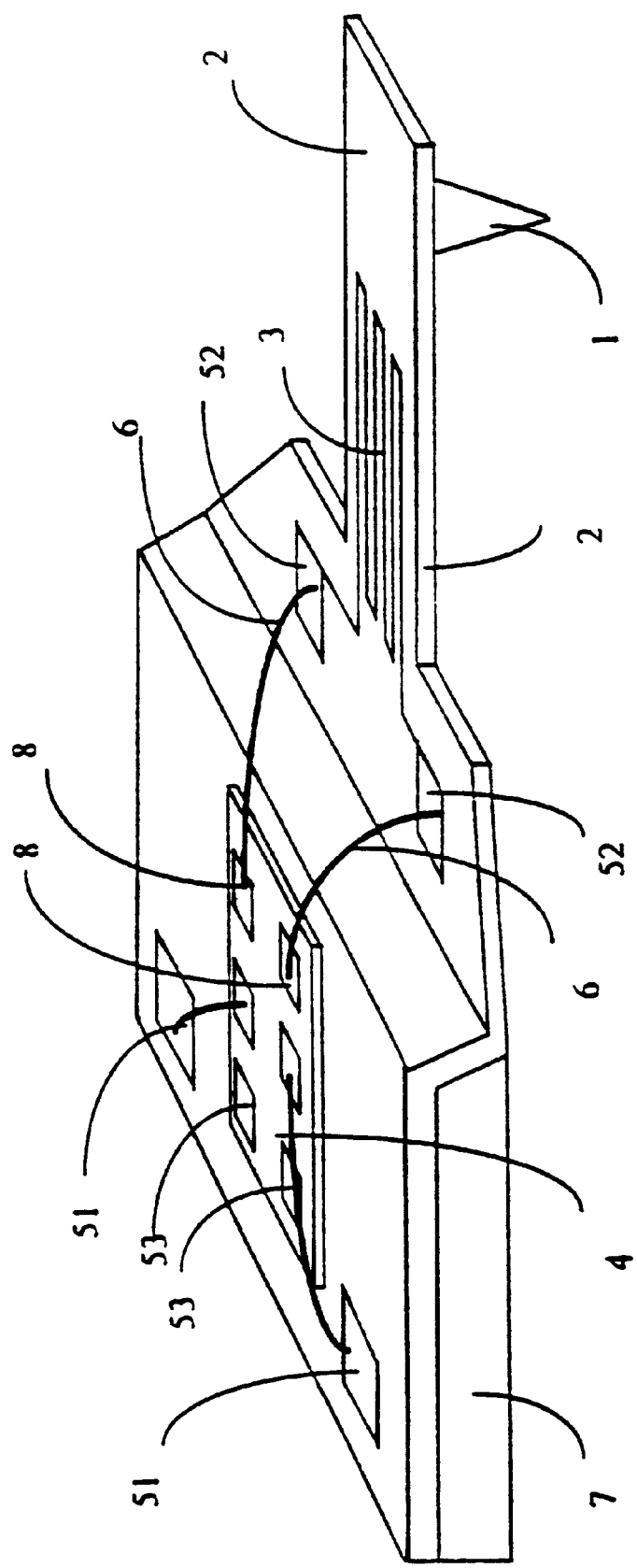

(B) INDEX OF THEIR COMPONENT NUMBERS
1 Probe
2 Cantilever
3 Resistance material (polysilicon resistance layer)
4 Processing circuit
6 Connecting wire
7 Cantilever substrate
8 Pad for processing circuit
9 Silicon dioxide
10 Positive Photoresist
11 Probe main body
12 Polysilicon
13 Silicon Nitride
30 Piezo-electric driving device
40 Calculation and control unit
50 Analog/digital signal converter
51 Output pad
52 Pad for resistance material
53 Power supply pad for processing circuit
60 Cantilever
61 Probe
62 Processing Circuit
65 Piezo-electric material
67 Pad for piezo-electric material
70 Cantilever
72 Resistance material
75 Input voltage pad
76 Output voltage pad
601 Bridge resistance
621 Wire connecting terminal
622 Resistance/voltage signal converter
623 Temperature compensator
624 Differential amplifier

DETAILED DESCRIPTION OF THE INVENTION

As shown in FIG. 1, the present invention makes use of the semiconductor processing technology to fabricate the probe 1 and resistance material 3 on the cantilever 2. Due to the limitation of the moving space for the probe 1 and wiring work, the present invention fabricates all the wire terminals on the opposite side of the surface of the cantilever from where the probe is located. The main function of the probe is to produce interactive action when it touches the sample to be tested, thereby to generate deformation of the cantilever 2. A processing circuit 4 is set up on the cantilever substrate 7 and is connected to the resistance material 32 by using a connecting wire 6 connected between the pad for the processing circuit 8 and the pad for the resistance material 52. The function of processing circuit 4 is to provide energy conversion from resistance to voltage using a Wheatstone Bridge, an instrument amplifier, a nonlinear compensatory circuit and a filter. After analog/digital signal conversion, calculation, and processing by the processing circuit, the signals are sent to the piezoelectric driving device in order to perform accurate 3-axis displacement. The signals, after being processed, are sent out through the output pad 51 of the high sensitivity strain probe. The power supply pad 53 for the processing circuit is used to connect to an outside power source. The device advantages are as follows:

1. The components used are simple, which makes the price low.
2. Signal amplification does not make use of the reflecting space, which effectively saves space.
3. The device is very convenient to operate, even non-professional persons can attain the same requirements.
4. The distance does not need to be adjusted, which effectively shortens the time required for testing.
5. The device employs integrated forming of semiconductor process, which lowers the noise that interferes with the circuits.

Figure 2A:
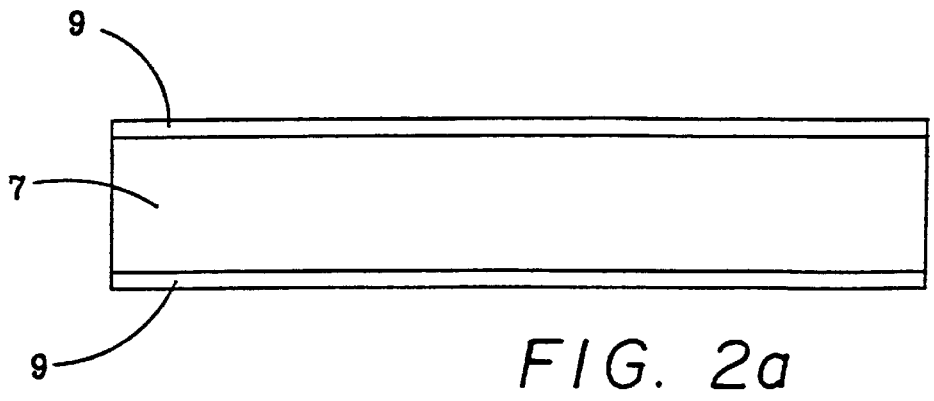
FIG. 2a through FIG. 2m are the schematic process diagrams of the present invention.
Figure 2B:
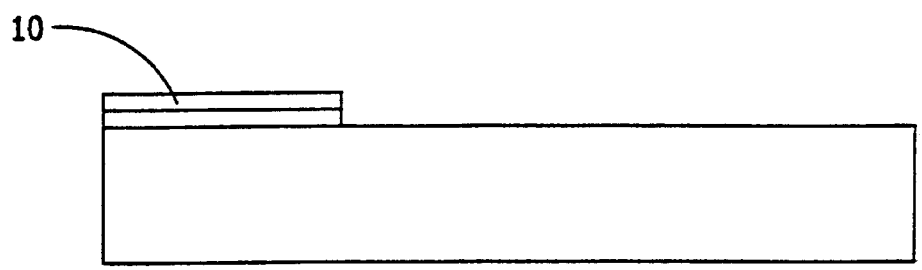
Figure 2C:
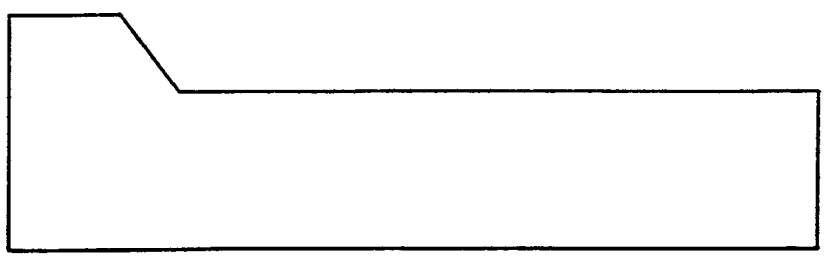
Figure 2D:
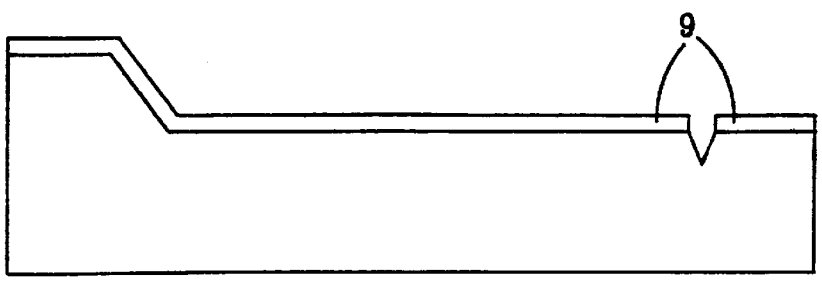
Figure 3:
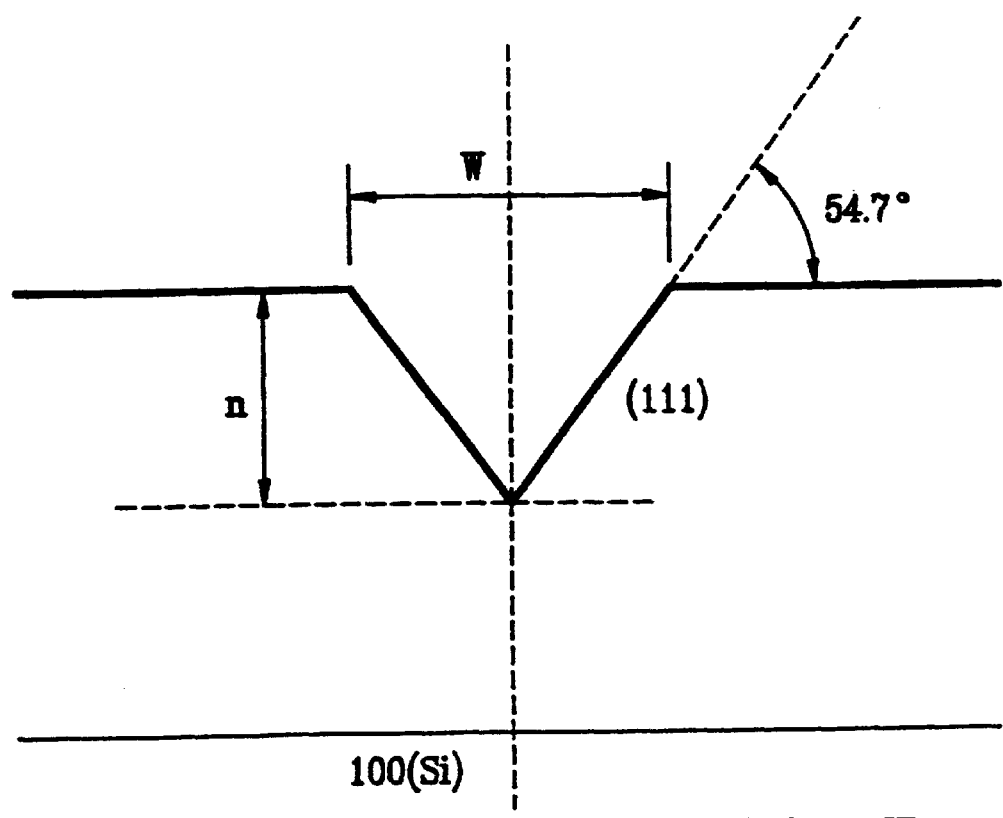
FIG. 3 shows the geometrical relation of the V-shape pit in the cantilever substrate.

FIG. 2a through FIG. 2m are the schematic diagrams of the integrated forming process. The general process steps are as follows:

a. The cantilever substrate 7 is fabricated from p-type silicon wafers, 4 inches long, 450 μm thick, with both sides polished and is deposited with masking material like silicon dioxide ($SiO_2$) as shown in FIG. 2a.

b. A layer of positive photoresist 10 is applied on the top layer of the silicon dioxide to serve as the masking material. The masking material is patterned by the use of buffered oxide etchant (BOE) at a etching rate of around 800 Å per minute. The resulting mask shown in FIG. 2b serves as a mask for anisotropical etching in the next step.

c. A mixture of 25% potassium hydroxide (KOH) is used to perform wet etching at 75° C. to form the contour shape of the bottom surface of the cantilever in the cantilever substrate as shown in FIG. 2c. Hydrofluoric acid is then applied to remove the masking material on the surface of the cantilever substrate.

d. One uses the same process to deposit a masking ma:erial of either a thermal oxide or silicon dioxide 9 and define the cross-sectional triangle of the pit. The pit is etched into the cantilever substrate as a V-shaped opening as shown in FIG. 3 to serve as a mold for the probe tip which preferably is conical but may have a pyramidical shape. Potassium hydroxide (KOH) is used to carry out wet etching to form the pit as shown in FIG.

Figure 2E:
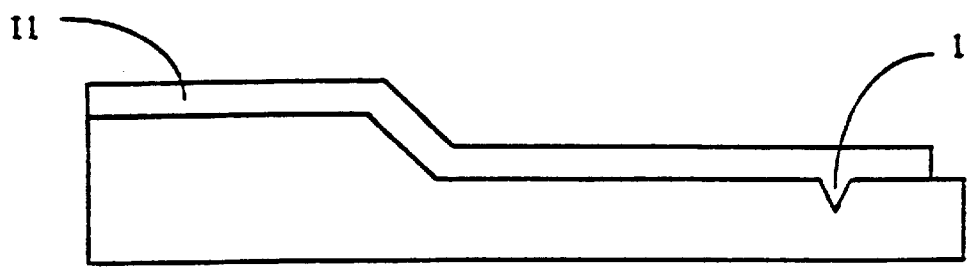
Figure 2F:
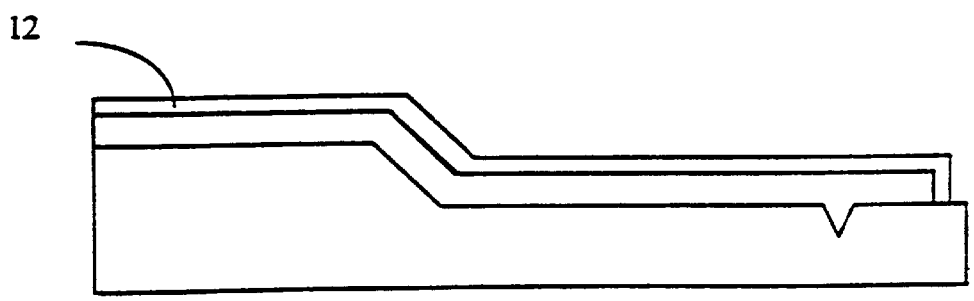
Figure 2G:
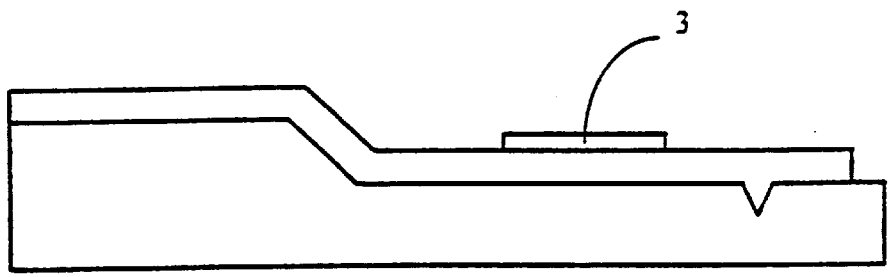
Figure 2H:
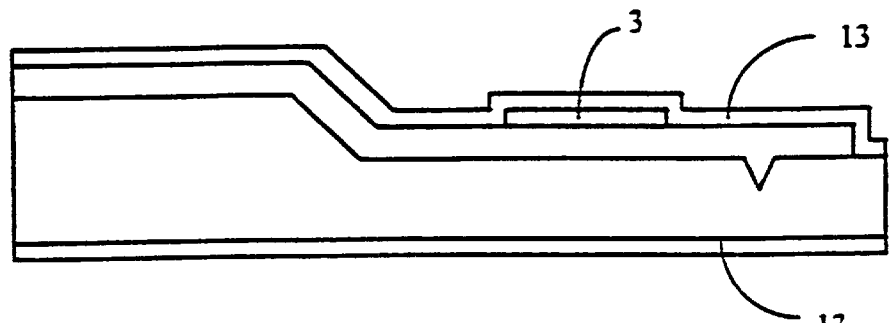
Figure 2I:
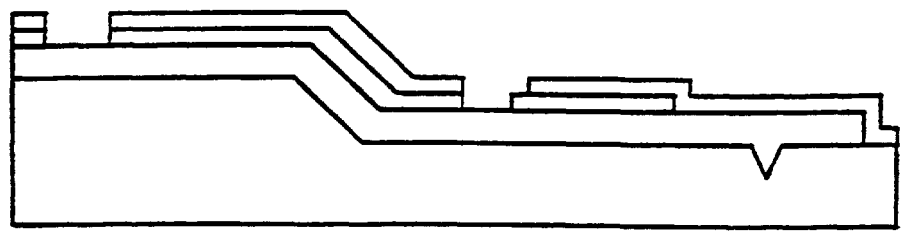
Figure 2J:
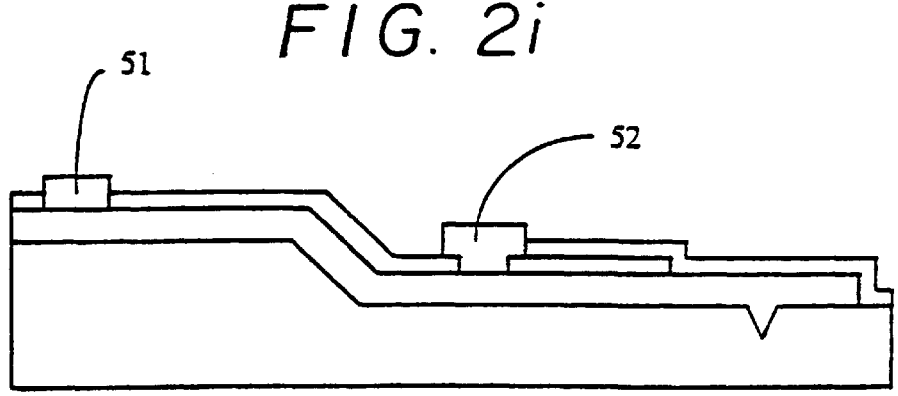
Figure 2K:
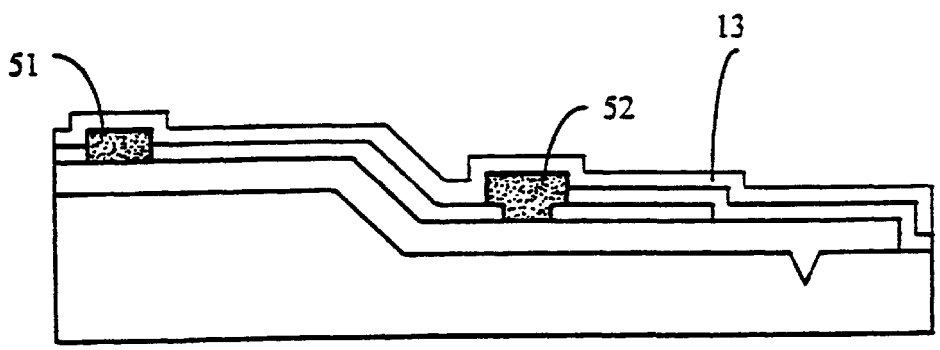
Figure 2L:
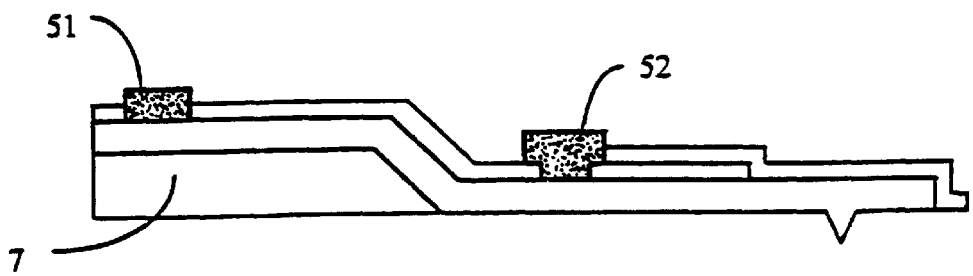

2d. In the preferred embodiment, the inclined sides of the pit have an angle of 54.7 degrees. The width (w) of the opening to the pit has a geometrical relation to the height (h) of the pit. The preferred embodiment has a height of 3.5 μm when a width of 5 μm is used for the opening. After the pit is formed, the mask is removed from the substrate by the etchant BOE.

e. A 2 μm thick film of thermal oxide is deposited on the silicon wafer at 1100° C. for 10 hours. The silicon wafer is annealed at 1100° C. for 1 hour to release the residual stress. The film is patterned and aligned to define the overall main body of the cantilever and the probe. Then silicon dioxide is deposited in the pit in order to form the tip of the probe as shown in FIG. 2e.

f. The polysilicon 12 possesses the advantage of having a gauge factor greater than other materials generally used as a piezoelectric resistor. A 1500 Å thick polysilicon film of low pressure chemical vapor deposition (LPCVD) is deposited at 620° C. to be used as the material for the strain gauge circuit (resistance material) 12 as shown in FIG. 2f.

g. In order to make the polysilicon electrically conductive, the $POCL_3$ blanket n+ diffusion is operated at 950° C. for 30 minutes as shown in FIG. 2f. The film then is patterned and aligned as a mask to define the resistance material 3 as shown in FIG. 2g. An etchant solvent mixture with $HF:HNO_3:CH_3COOH=1:26:33$ is used to etch at a rate of 1500 Å per minute.

h. In order to protect the resistance material during aluminum patterning and back etching later, a 1000 Å thick LPCVD film of silicon nitride ($Si_3N_4$) 13 is deposited at 750° C. as shown in FIG. 2h. The silicon nitride film also isolates the polysilicon from the aluminum.

i. The film is patterned and aligned to generate the hole openings to form the contact pads. The positive photoresist is first spun coated on the patterned surface. The photoresist is patterned and aligned in the same way as the $S_3N_4$ film. That is the two successive processes use the same mask as shown in FIG. 2i.

j. A 5000 Å thick of aluminum film is evaporated by the thermal coater. The lift-off technique is employed to define the aluminum contact pads, i.e., the output pad 51 and pad for resistance material 52. The lift-off technique is accomplished by lifting off the aluminum film with the photoresist stripping. The result is shown in FIG. 2j.

k. Before the wafer is etched from the back with KOH, a $S_3N_4$ film to protect the aluminum contact pads and the main structure is formed as shown in FIG. 2k. Although the etching rate of around 60 Å per minute of oxide is extremely slower than the etching rate of around 1 μm per minute of silicon in 25% concentration of KOH mixture at 75° C., the oxide film exposed to the etchant also needs to be protected because of the long etching time. The wafer is then immersed in a 25% concentration of KOH mixture at 75° C. After approximately 7.5 hours, the silicon below the bottom plane of the cantilever is removed by the wet etching when the etching is stopped at the level of the oxide film. The protective $S_3N_4$ film is removed by reactive ion etching (RIE) which is operated at 100 watts by a mixed gas with $CF_4:O_2=40:5$ (the etching rate of $S_3N_4$ is around 700 Å per minute), and the device is shown in FIG. 2l.

Figure 2M:
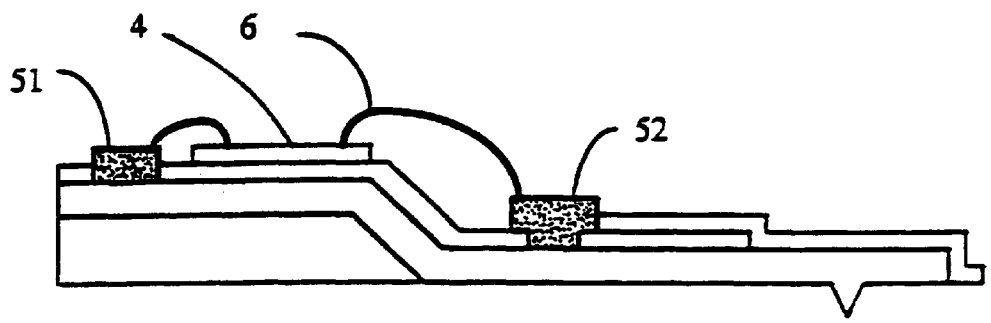

1. Finally, the processing circuit is applied and connecting wires 6 are connected to each pad as shown in FIGS. 1 and 2m.

Figure 4:
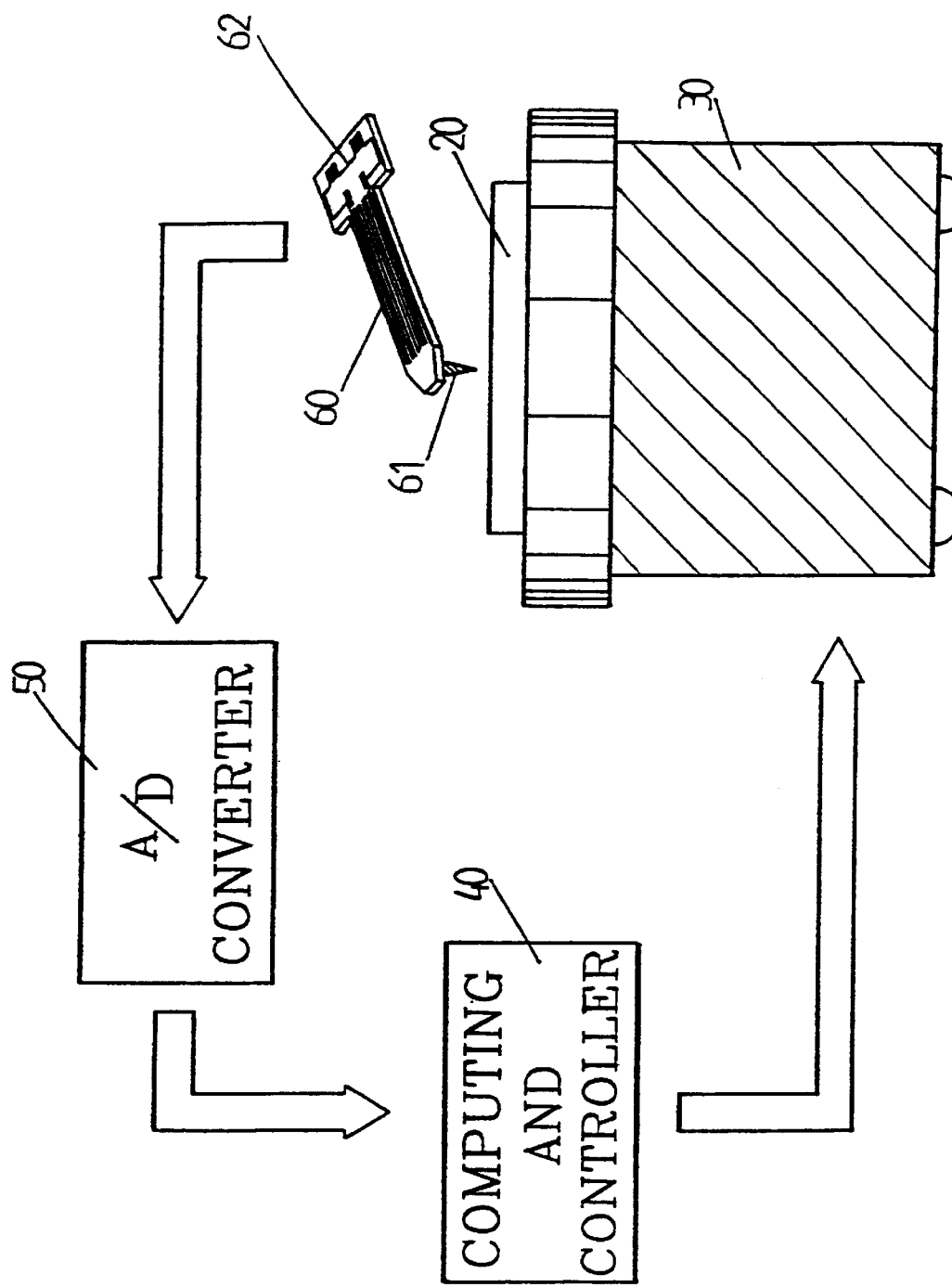
FIG. 4 is the block diagram of another embodiment of the probe type microscope.

FIG. 4 is a block diagram of another strain probe of the present invention. The cantilever structure uses the process technology of a semiconductor to provide a surface with piezo-electric material on the cantilever 60 to provide the deformation signal when the cantilever and probe are subjected to a force. The resistance variation signal is transferred through wiring on the top of the cantilever 60 to provide a signal to the processing circuit 62. After processing by the analog/digital signal transducer 50 and the calculation and control unit 40, a signal is sent to the piezo-electric driving device 30 to allow for accurate 3-axes movement.

Figure 5:
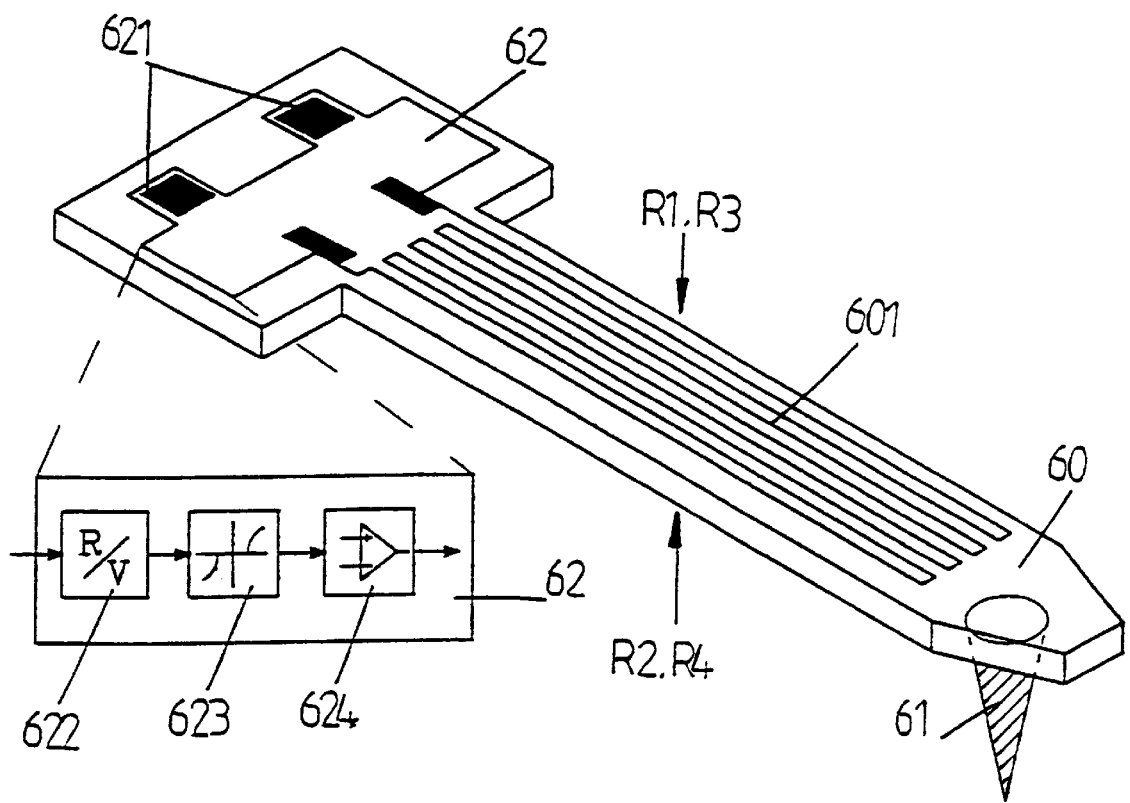
FIG. 5 is the structural diagram of the strain gauge of FIG. 4.
Figure 6:
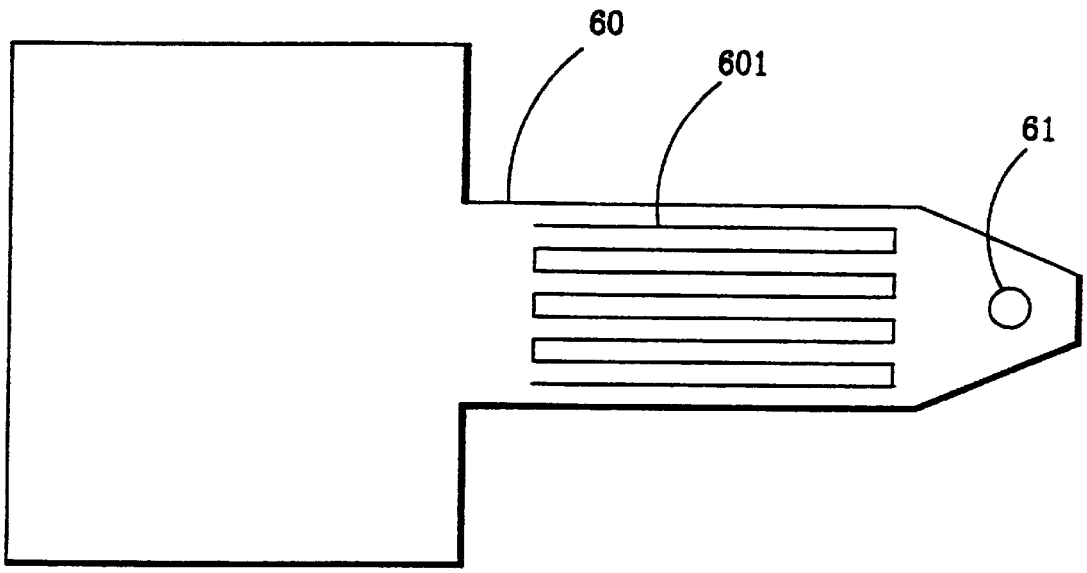
FIG. 6 is a plan view of the bottom of the strain gauge of FIG. 4 when piezo-electric material is placed there.
Figures 7A, 7B:
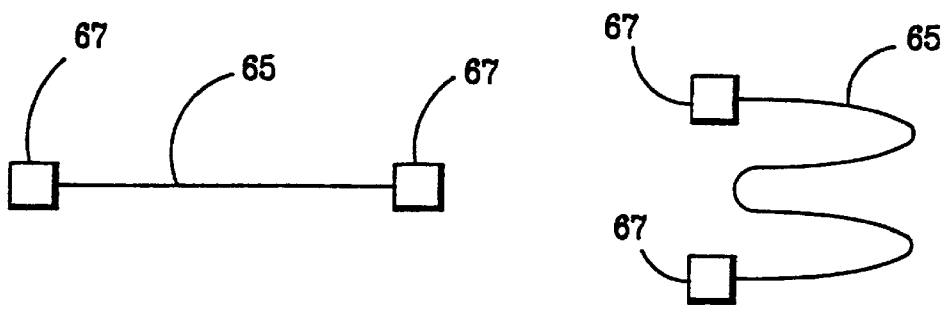
FIGS. 7a and 7b show examples of possible patterns for the piezo-electric material.

FIG. 5 is the structural diagram of the present invention. The overall profile shows a "T" shape with a surface having piezo-electric material (a bridge resistance 601 consisting of R1, R2, R3 and R4) that may be placed on either or both the top and bottom (shown in FIG. 6) of the cantilever 60. FIGS. 7a and 7b show examples of patterns that the piezo-electric material 65 may be etched as with attached pads 67 for the piezo-electric material. When the probe is subjected to force, the deformation signal can be converted into a signal representing the variation in the electrical resistance to provide the processing circuit with an amplified signal. The signal then is filtered and amplified through the processing circuit 62 to convert the signal into a voltage for processing by the analog/digital signal converter 50 and the calculation and control unit 40. After processing, the signal is sent to the piezo-electric driving device 30.

Figure 8:
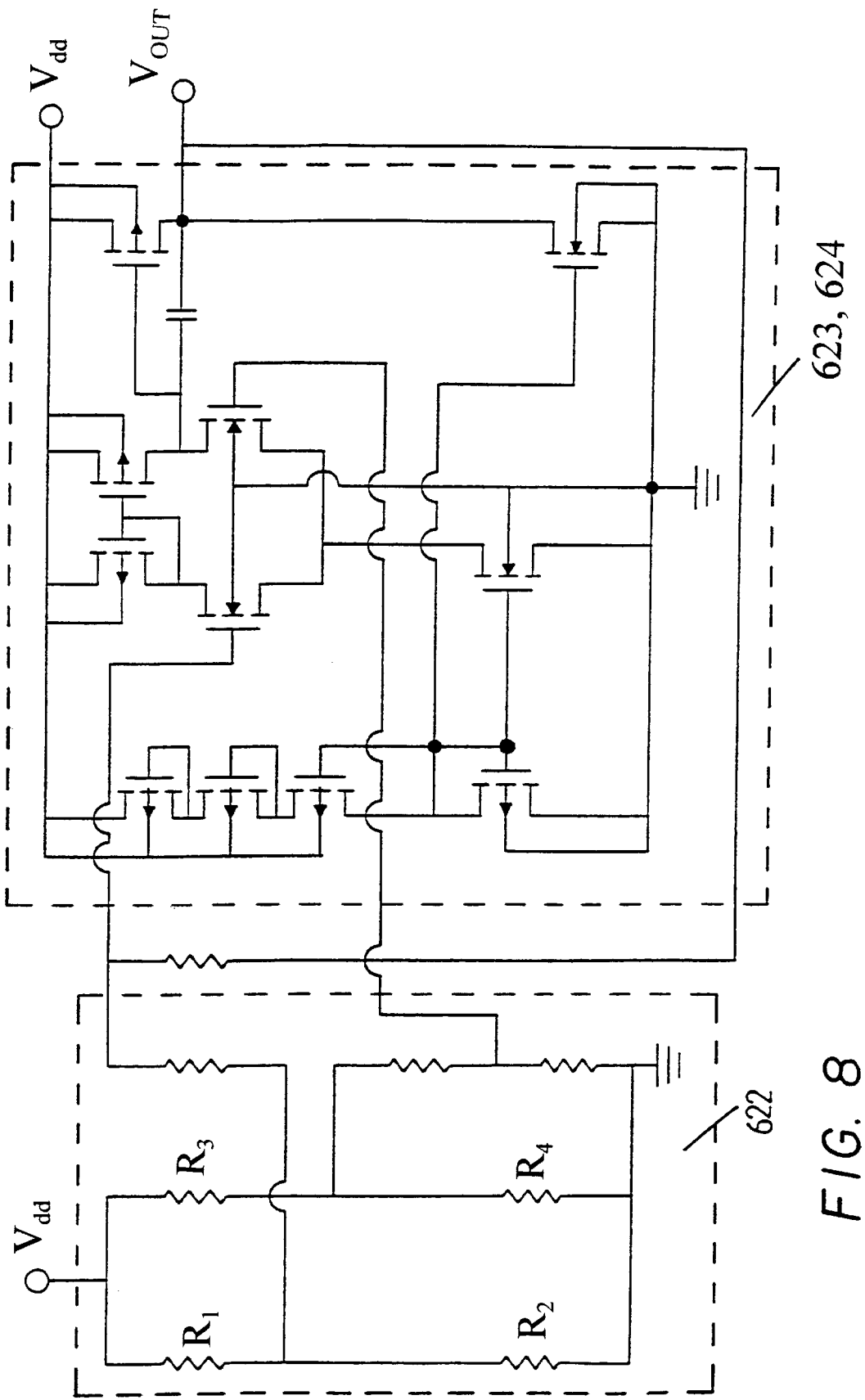
FIG. 8 is the processing circuit diagram for the strain gauge of FIG. 5.

A piezoelectric system is a scanning system having a piezo-electric transistor 3-axes positioner (not shown in the Figures) which mainly provides the test piece with the functions of scanning and up-and-down motion. The piezo-electric driver is the power driver of the piezo-electric system. It receives the output signal from the controller, then the signal is amplified to the voltage value required by the piezo-electric transistor, which generally needs high voltage, through a power amplifier. FIG. 8 shows the processing circuit 62 which includes a resistant/voltage signal converter 622, a temperature compensator 623, and a differential amplifier 624. Among them, the input terminal of the power source is $V_{dd}$, the output terminal of the signal is $V_{out}$, the resistance/voltage signal converter 622 is constructed with an electrical bridge to perform the function of temperature compensation, while the temperature compensator 623 and the differential amplifier 624 are constructed with a p-channel and n-channel of metal oxide semiconductor (MOS).

Figure 9A:
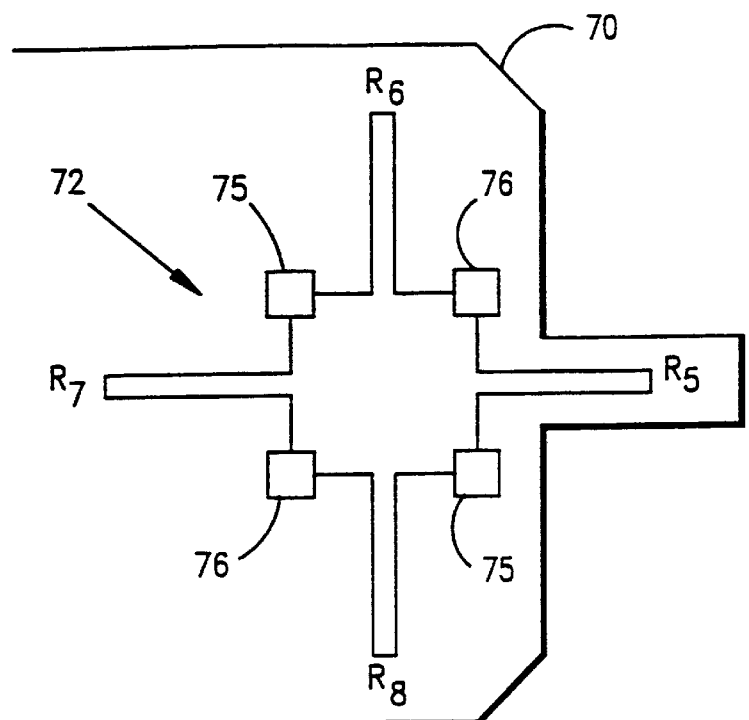
FIGS. 9a and 9b show other embodiments for the structure of the resistance material.
Figure 9B:
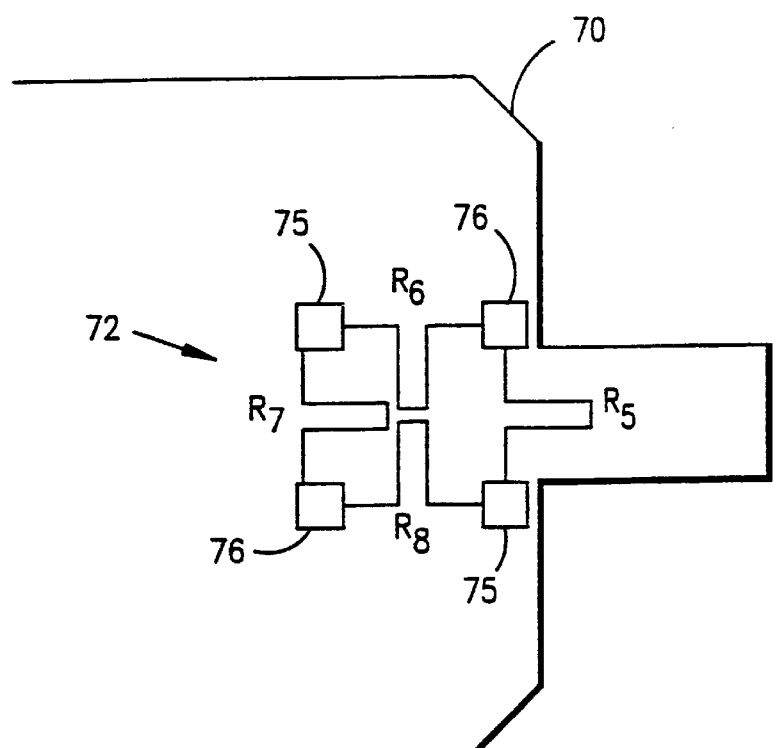

In another embodiment the resistance material 72 on the cantilever 70 is made with a Wheatstone bridge circuit with resistors R5, R6, R7, and R8 as shown in FIGS. 9a and 9b. Input voltage pads 75 and output voltage pads 76 for the resistance material provide connection points to the processing circuit (not shown). A Wheatstone bridge not only has the advantages of increasing output voltage, but also it can compensate temperature. Two cases designed by the principle of a bridge circuit are shown in FIGS. 9a and 9b, pads 75 provides the input voltage and pads 76 are for the output voltage. FIG. 9a is the basic design which only has one active resistor. Once the temperature varies, the FIG. 9a circuit has difficulties compensating for temperature. In FIG. 9b, R5 is an active resistor and R6, R7, and R8 are fixed value resistors. The design can compensate temperature because R5, R6, R7, R8 nearby suffer the same situation so that the term of temperature effect cancels out. Actually, if all four resistors are active, the voltage output will be larger than the value from the FIG. 9b circuit. However, according to our analysis, we know that when the resistor layer is added to the cantilever, the strain will be decreased because the thickness of resistors constrains the bending of the cantilever. Based on this reason, there must be a compromise in temperature effect and the number of active resistors.

From the foregoing statements, the present invention, because of its special fabrication process, is a high-sensitivity strain probe with high reliability which is a design having great practical value that can cut down the number of elements required, lower the cost and save time. By the use of solid forming type of semiconductor design, it can protect its accuracy from being affected by circuit errors, noise and external interference, thereby, greatly raising the system reliability without needing to adjust a laser beam which can save time and is very convenient.

To summarize the above-mentioned statement, the high-sensitivity strain probe of the present invention can provide an effective method, in the light of the shortcomings of prior art probe devices, such that technicians can enjoy its convenience and practical capabilities. It is the inventor's belief that the present invention will be very beneficial for industry.

Although the present invention has been illustrated and described previously with reference to the preferred embodiments thereof, it should be appreciated that it is in no way limited to the details of such embodiments, but is capable of numerous modifications within the scope of the appended claims.

What is claimed is:

1. A method of fabrication of a high-sensitivity strain probe comprising the following steps:

providing a cantilever substrate, shaping the cantilever substrate, forming a pit in the cantilever substrate so as to provide a mold for a probe, forming the probe in the pit, forming a cantilever on the cantilever substrate and the probe such that the probe depends from the cantilever, forming a resistance material on the cantilever, forming a plurality of pads on the cantilever, removing a portion of the cantilever substrate up to a plane of the cantilever, depositing a processing circuit on the cantilever, and providing wires connecting the plurality of pads, processing circuit and resistance material.

2. The method of fabrication of a high-sensitivity strain probe as defined in claim 1, wherein the cantilever substrate is formed from silicon wafers.

3. The method of fabrication of a high-sensitivity strain probe as defined in claim 1, wherein the step of shaping the cantilever substrate includes the following steps:

depositing a masking material on a surface of the cantilever substrate, etching the surface of the cantilever substrate with a mixture containing potassium hydroxide, and removing the masking material with hydrofluoric acid.

4. The method of fabrication of a high-sensitivity strain probe as defined in claim 1, wherein the step of forming a resistance material includes the following steps:

depositing a layer of polysilicon on the cantilever, making the polysilicon electrically conductive, patterning and aligning the polysilicon, and etching with a solvent.

5. The method of fabrication of a high-sensitivity strain probe as defined in claim 1, wherein the step of forming a plurality of pads includes the following steps:

depositing a silicon nitride film over a top surface of the cantilever and the resistance material, patterning and aligning the silicon nitride film, etching to form openings for the contact pads, spin coating a photoresist, patterning and aligning the photoresist identical to the silicon nitride film, evaporating an aluminum film, and lifting off a portion of the aluminum film on the photoresist.

6. The method of fabrication of a high-sensitivity strain probe as defined in claim 1, wherein the step of removing a portion of the cantilever substrate includes the following steps:

depositing a silicon nitride film over the plurality of pads, the resistance material, and the cantilever, etching with a mixture containing potassium hydroxide, and removing the silicon nitride film with reactive ion etching.

* * * * *